United States Patent [19]

Ogawa et al.

[11] Patent Number: 5,625,457
[45] Date of Patent: Apr. 29, 1997

[54] METHOD AND APPARATUS FOR NON-CONTACT MEASUREMENT OF RELATIVE DISPLACEMENT

[75] Inventors: Hirofumi Ogawa, Tsukuba; Yuichi Ishikawa, Tokyo; Tokio Kitahara, Tsukuba, all of Japan

[73] Assignee: Agency of Industrial Science & Technology Ministry of International Trade & Industry, Tokyo, Japan

[21] Appl. No.: 550,732

[22] Filed: Oct. 31, 1995

[30] Foreign Application Priority Data

Nov. 1, 1994 [JP] Japan .................... 6-292343

[51] Int. Cl.$^6$ ................................................ G01B 11/00
[52] U.S. Cl. ........................ 356/390; 356/396; 356/373
[58] Field of Search ........................ 356/390, 396, 356/373

[56] References Cited

U.S. PATENT DOCUMENTS

| | | | |
|---|---|---|---|
| 3,068,743 | 12/1962 | Dyson | 356/390 |
| 3,560,097 | 2/1971 | Gavrilkin | 356/396 |
| 3,652,167 | 3/1972 | Smith | 356/390 |
| 3,724,959 | 4/1973 | Koulicovitch | 356/396 |

*Primary Examiner*—Frank Gonzalez
*Assistant Examiner*—Reginald M. Ratliff
*Attorney, Agent, or Firm*—Oblon, Spivak, McClelland, Maier & Neustadt, P.C.

[57] ABSTRACT

An apparatus for performing non-contact measurement of relative displacement includes a microscope having one objective lens and two fields of view in which two points of measurement on a test piece can be located separately, a pair of cameras for taking images obtained with the microscope, and an apparatus for measuring the relative displacement of the images of the two points of measurement obtained by the cameras.

2 Claims, 4 Drawing Sheets

METHOD AND APPARATUS FOR NON-CONTACT MEASUREMENT OF RELATIVE DISPLACEMENT

BACKGROUND OF THE INVENTION

1. Field of the Invention

The present invention relates to a method and apparatus for non-contact measurement of relative displacement between two or more points, such as are used in various industrial fields to measure deformation of test pieces in material testing, to check spring properties, and to make other such measurements.

2. Description of the Prior Art

To measure deformation of a test piece in a material test procedure, to check the properties of a spring by measuring extension and/or compression deformation of the test piece and spring, and other such measurements are performed by gripping the test piece or spring with a test machine, subjecting the test piece or spring to deformation, and measuring the relative displacement between two points which are set a prescribed distance apart on the test piece. When the test piece is small, the amount of deformation is minute, the test takes place in a high temperature atmosphere and in other such cases in which a strain gage, extensometer or other such contact methods for measuring cannot be used, a microscope is used to measure the deformation. Specifically, the region of the test piece around the points of measurement is magnified in the field of view of the microscope, a video camera is used to take the magnified images, and the taken images are subjected to image processing to detect the relative displacement of the two points of measurement.

Conventionally this measurement has been performed using a microscope having one field of view, such as the microscope 51 shown in FIG. 6 (a). To use a single field of view microscope 51, marks 11 put on the test piece 7 to indicate the two points of measurement have to be located within the field of view 17 of the microscope. However, when the amount of measurement point displacement relative to the distance between the points of measurement is very small, it is difficult to measure the displacement, since it is impossible to magnify only the displacement of the two points. When the two points of measurement cannot be located within the field of view because of high magnifications, displacement can be measured by mounting the microscope on a translation stage and moving the microscope to measure displacement of the points of measurement before and after a load is applied to the test piece. When the displacement is very small, however, accurate measurements are difficult with this method owing to presence of such factors as the accuracy of the linear motion of the stage and positioning accuracy, and furthermore, it is also difficult to perform continuous measurements. Instead of using a single microscope, the arrangement shown in FIG. 7 (a) can be used in which two microscopes 51 are used, each trained on one of the two points of measurement 8 on the test piece 7. As shown in FIG. 7 (b), however, when there is not much distance between the two points of measurement 8, it is difficult to locate the points within the respective fields of view unless the microscopes are set very close together, since the approach between the two microscopes 51 gives rise to problems such as contact between the microscopes that often causes difficulties in practice.

OBJECT AND SUMMARY OF THE INVENTION

The object of this invention is to provide a method and apparatus for non-contact measurement of relative displacement that enables the measurement to be performed even when the displacement of points of measurement is very small relative to the distance between the points, and enables relative displacement of points of measurement to be accurately measured even when the distance between the points of measurement is very small.

For achieving this object, the present invention provides a method for non-contact measurement of relative displacement, comprising placing a mark at each of two points of measurement on a test piece, separately locating each mark in a field of view of a microscope having two fields of view and one objective lens, and measuring relative displacement of images of the two marks formed by the microscope.

The object is also achieved by an apparatus for non-contact measurement of relative displacement, comprising a microscope having one objective lens and two fields of view in which two points of measurement on a test piece can be located separately, a pair of cameras for taking images obtained with the microscope, and an apparatus for measuring relative displacement of images of the two points of measurement taken by the pair of cameras.

Marks are used to indicate the two points of measurement on the test piece, and the distance between the marks is measured beforehand. The test piece is placed on the testing machine and arranged so that one mark comes within one field of view, and the other mark comes within the other field of view, of a microscope having two fields of view and one objective lens, and the marks are magnified. Cameras are used to take the images of the two marks obtained by the microscope, and the taken image information is processed by an image processor to measure the relative displacement of the two marks, thereby obtaining the relative displacement between the measurement points. The microscope has one objective lens but two fields of view, in each of which is located a mark. Thus, since just the vicinity of each mark is magnified, the distance between the two marks does not affect the field of view, therefore, it is possible to measure the relative displacement even when the amount of displacement of the points of measurement is very small relative to the distance between the points. Also, even when the distance between the measurement points is very small, the use of a single microscope eliminates the need to place plural microscopes close together with the possibility of contact between the microscopes. Thus, displacement between the points of measurement can be easily and accurately measured.

The above and other features of the present invention will become apparent from the following description made with reference to the drawings.

BRIEF EXPLANATION OF THE DRAWINGS

FIG. 6 (b) shows the field of view of the microscope of FIG. 6 (a);

FIG. 7 (b) shows the fields of view of the microscopes of FIG. 7 (a).

DESCRIPTION OF THE PREFERRED EMBODIMENT

Figure 1:
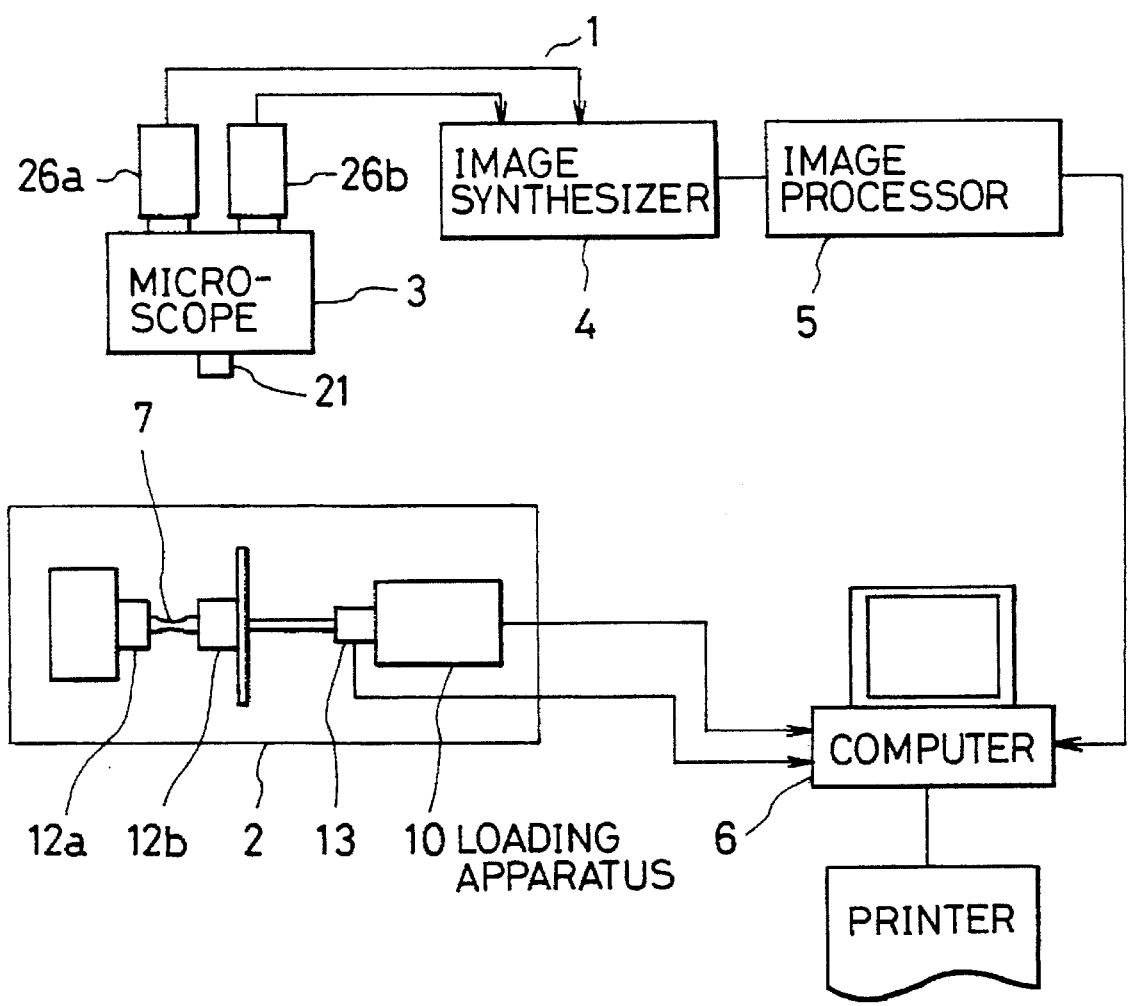
FIG. 1 is a schematic view of the configuration of an apparatus for non-contact measurement of relative displacement according to the invention.
Figure 2:
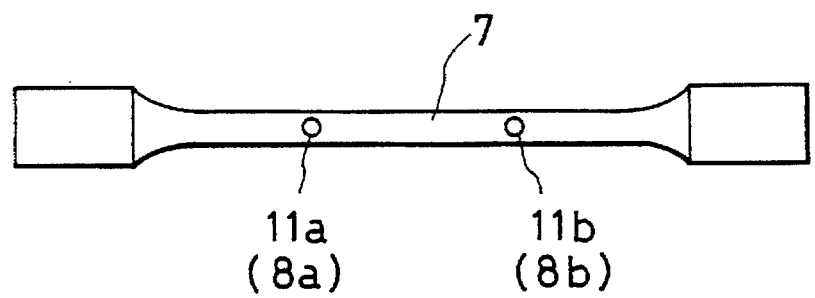
FIG. 2 shows an example of a test piece that can be used with the apparatus of FIG. 1.

FIG. 1 shows the configuration of an apparatus 1 for non-contact measurement of relative displacement, according to this invention. The measuring apparatus 1 includes a material testing apparatus 2, a microscope 3, an image synthesizer 4, an image processor 5 and a computer 6. A test piece 7 is gripped with the material testing apparatus 2. With reference to FIG. 2, which shows an example of a test piece 7, measurement points 8a and 8b are represented by the edges or centers of marks 11a and 11b. Paint or ink is used to form the marks 11a and 11b. The material testing apparatus 2 has a fixed grip 12a and a loading grip 12b. The test piece 7 is held at one end to the fixed grip and at the other end to the loading grip. A loading apparatus 10 and a load cell 13 are connected to the loading grip 12b. Loads are applied by the loading apparatus 10 and measured by the load cell 13.

Figure 3:
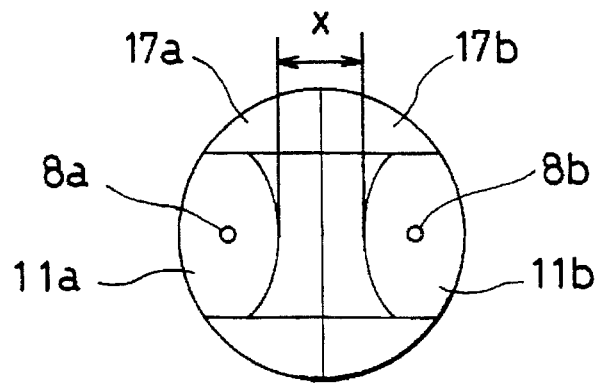
FIG. 3 shows a composite image of the two fields of view of the microscope used in the apparatus of FIG. 1.
Figure 4:
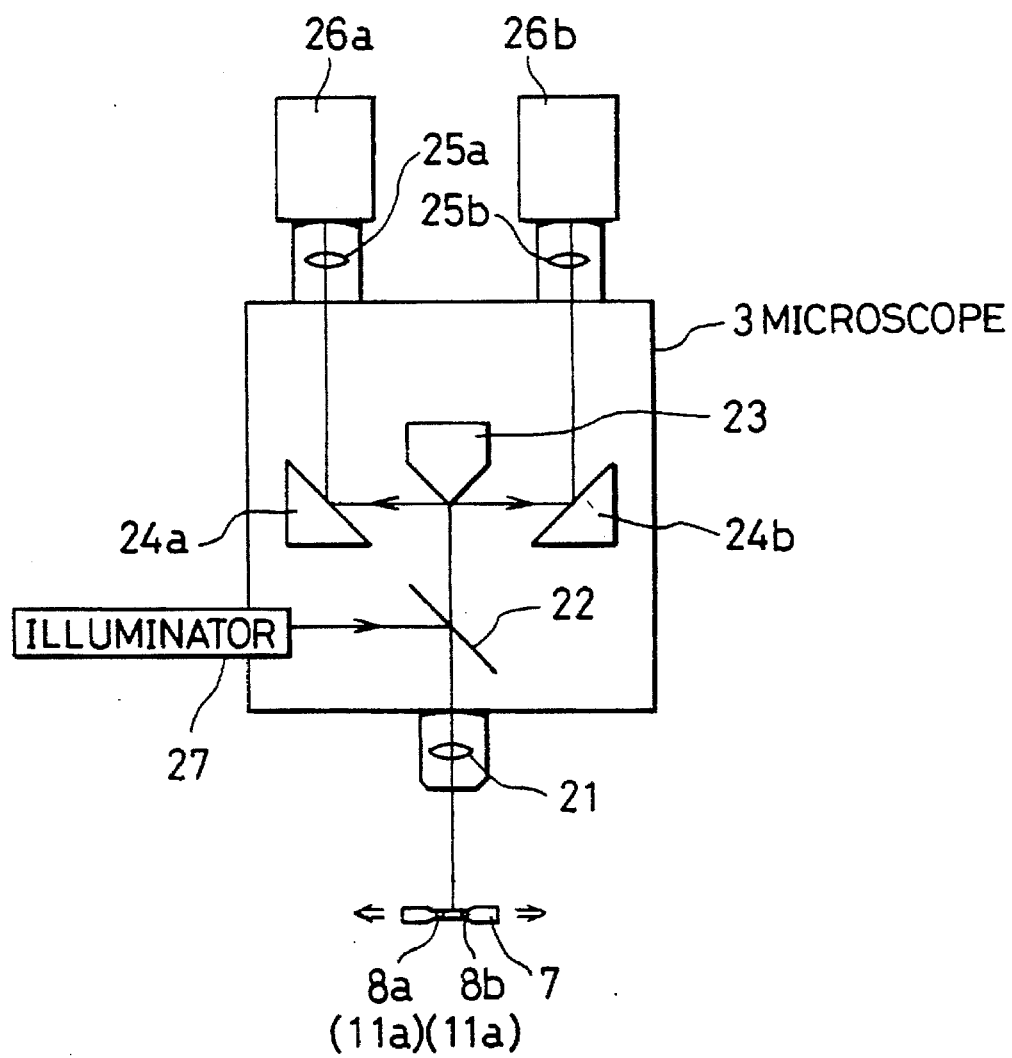
FIG. 4 shows the configuration of the optical system of the microscope of FIG. 3;ng

The output of the load cell 13 is inputted to the computer 6. A microscope 3 having two fields of view and one objective lens 21 is disposed over the test piece 7. As shown in FIG. 3, the microscope 3 has two fields of view 17a and 17b, and can produce two magnified images of the marks 11a and 11b in the fields of view 17a and 17b, respectively, for indicating the measurement points 8a and 8b. Image signals from the fields of view 17a and 17b are combined by the image synthesizer 4 and processed by the image processor 5, to measure the distance between the two points. The image processor 5 outputs signals to the computer 6. A commercially-available microscope can be utilized as the two-fields-of-view microscope; FIG. 4 shows an example of the optical system of the two-fields-of-view microscope. As shown, the microscope 3 includes an objective lens 21, a semi-reflecting mirror 22, a beam-splitter 23, deflecting mirrors 24a and 24b, and oculars 25a and 25b. Imaging devices 26a and 26b, such as CCD cameras, for example, can be attached to the oculars 25a and 25b. An optical fiber illuminator 27 is arranged on the reflecting side of the semi-reflecting mirror 22.

The steps whereby the relative displacement of the measurement points 8a and 8b on the test piece 7 are measured, using the apparatus 1 thus configured, will now be described. The test piece 7 with the marks 11a and 11b indicating the measurement points 8a and 8b, which are separated by a distance which is known beforehand, is fixed to the grips 12a and 12b of the material testing apparatus 2. The loading apparatus 10 is then activated to apply loads to the test piece 7 via the loading grip 12b. These loads are measured by the load cell 13. In the microscope 3, a light beam from the optical fiber illuminator 27 is reflected by the semi-reflecting mirror 22 through objective lens 21 onto the test piece 7. A microscope has a selected objective lens with a magnification that allows the two marks 11a and 11b on the test piece 7 to come within each single field of view.

Light reflected from the test piece 7 passes back through the objective lens 21 and semi-reflecting mirror 22, and is split by the beam-splitter 23 into measurement point 8a light and measurement point 8b light. Reflected light from the measurement point 8a is deflected to an ocular 25a by a mirror 24a and reflected light from the measurement point 8b is deflected to an ocular 25b by a mirror 24b. Images of the two measurement points 8a and 8b on the test piece 7 are taken by the respective imaging devices 26a and 26b attached to the oculars 26a and 26b. The taken images are combined by the image synthesizer 4, and the distance (denoted in FIG. 3 by X) between the edges of the marks 11a and 11b of the measurement points 8a and 8b is measured and these data are input to the computer 6. The computer 6 also receives signals from the load cell 13 indicating the loads applied to the test piece 7, and signals from the image processor 5 indicating changes in the distance (X in FIG. 3) between the edges of the measurement point marks 11a and 11b. A printer can be used to draw load-elongation curves.

FIG. 3 shows the image of the field of view 17a of the ocular 25a combined with the image of the field of view 17b of the ocular 25b by the image synthesizer 4; X denotes the distance between the marks 11a and 11b.

Figure 5:
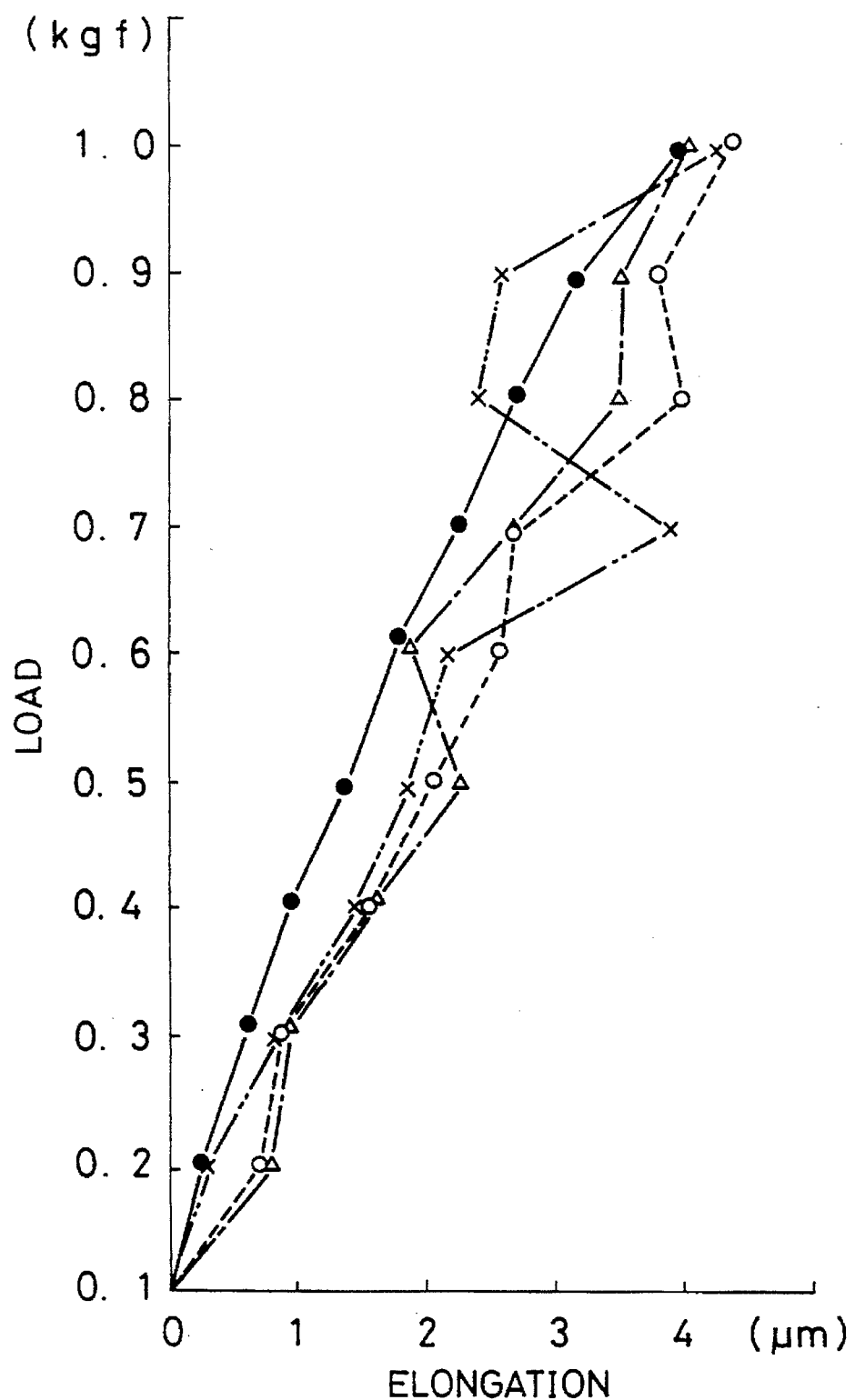
FIG. 5 is a graph showing a load-elongation curve, based on measurement data obtained using the displacement measurement apparatus of the invention.
Figure 6A:
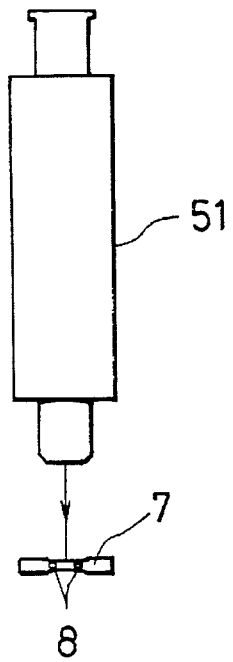
FIG. 6 (a) illustrates a method for measuring displacement using a conventional microscope having one field of view.
Figure 6B:
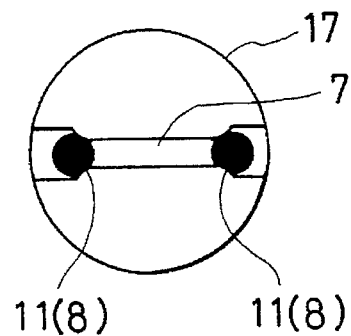
Figure 7A:
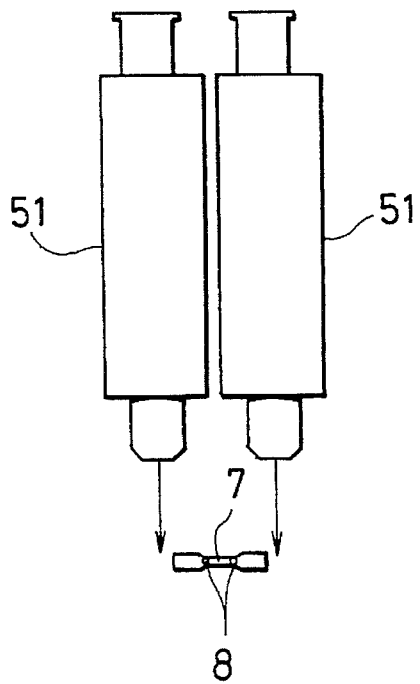
FIG. 7 (a) illustrates a method for measuring displacement using two conventional microscopes each having one field of view.
Figure 7B:
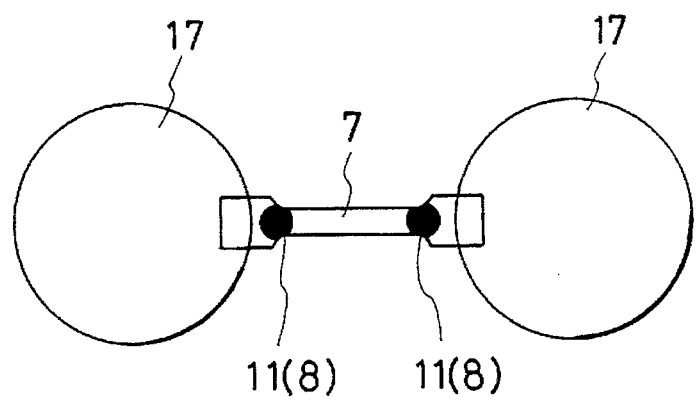

FIG. 5 shows the results (indicated by ●) of measurements of elongation of a test piece obtained with the relative displacement measuring apparatus using a microscope having two fields of view in accordance with the invention. The test piece was of SUS 304, having a thickness of 50 μm, a width of 226 μm and a gage length of 699 μm. The two-fields-of-view microscope was made by the Japanese company, Kougaku Gijutu Co., Ltd., having 44.4 magnifications and a resolving power of 0.12 μm. And the objective lens 21 was a model CF M Plan ELWD made by the Japanese company, Nikon Corporation, having 20 magnifications. From FIG. 5, it can be seen that, in accordance with the method of this invention, good measurement results could be obtained, with elongation proportional to the load. For reference, the results of test piece elongation measurements using a conventional microscope moved on a translation stage are included (curves o, Δ, and x). It can be seen that although the same test conditions were used, in the case of the prior art arrangement, there were variations in the measurement values, including errors of stage linearity and positioning errors, and elongations were not always proportional to the loads.

As described in the foregoing, with the apparatus for non-contact measurement of relative displacement according to the invention, using the two fields of view, magnified images are obtained concerning just the vicinity of the measurement points of the test piece. This enables displacement to be accurately measured in material tests et al. even when the displacement is small compared to the distance between the points. Also, measurement point images can be obtained using just one microscope, even when the measurement points on a test piece are close together. This means that measurements are not subjected to restrictions imposed by the disposition of the microscope, and this invention enables accurate measurements to be obtained on a real time basis.

What is claimed is:

1. A method for non-contact measurement of relative displacement, comprising the steps of:

placing a mark at each of two points of measurement on a test piece;

separately locating each mark in a field of view of a microscope having two fields of view;

capturing, using a first camera, an image of a first one of said marks through a first one of said fields of view through an objective lens;

capturing, using a second camera, an image of a second one of said marks through a second one of said fields of view through said objective lens; and measuring a relative displacement of the images of the two marks captured using the camera.

2. An apparatus for non-contact measurement of relative displacement, comprising:

a microscope having one objective lens and two fields of view in which two points of measurement on a test piece can be located separately;

a pair of cameras, each camera corresponding to a different one of the fields of view, for taking images obtained with the microscope; and an apparatus for measuring relative displacement of images of the points of measurement taken by the cameras.

* * * * *